P. ENGLISH.
REVERSIBLE HYDRAULIC TRANSMISSION.
APPLICATION FILED JULY 21, 1910.
1,028,451.
Patented June 4, 1912.
2 SHEETS—SHEET 2.
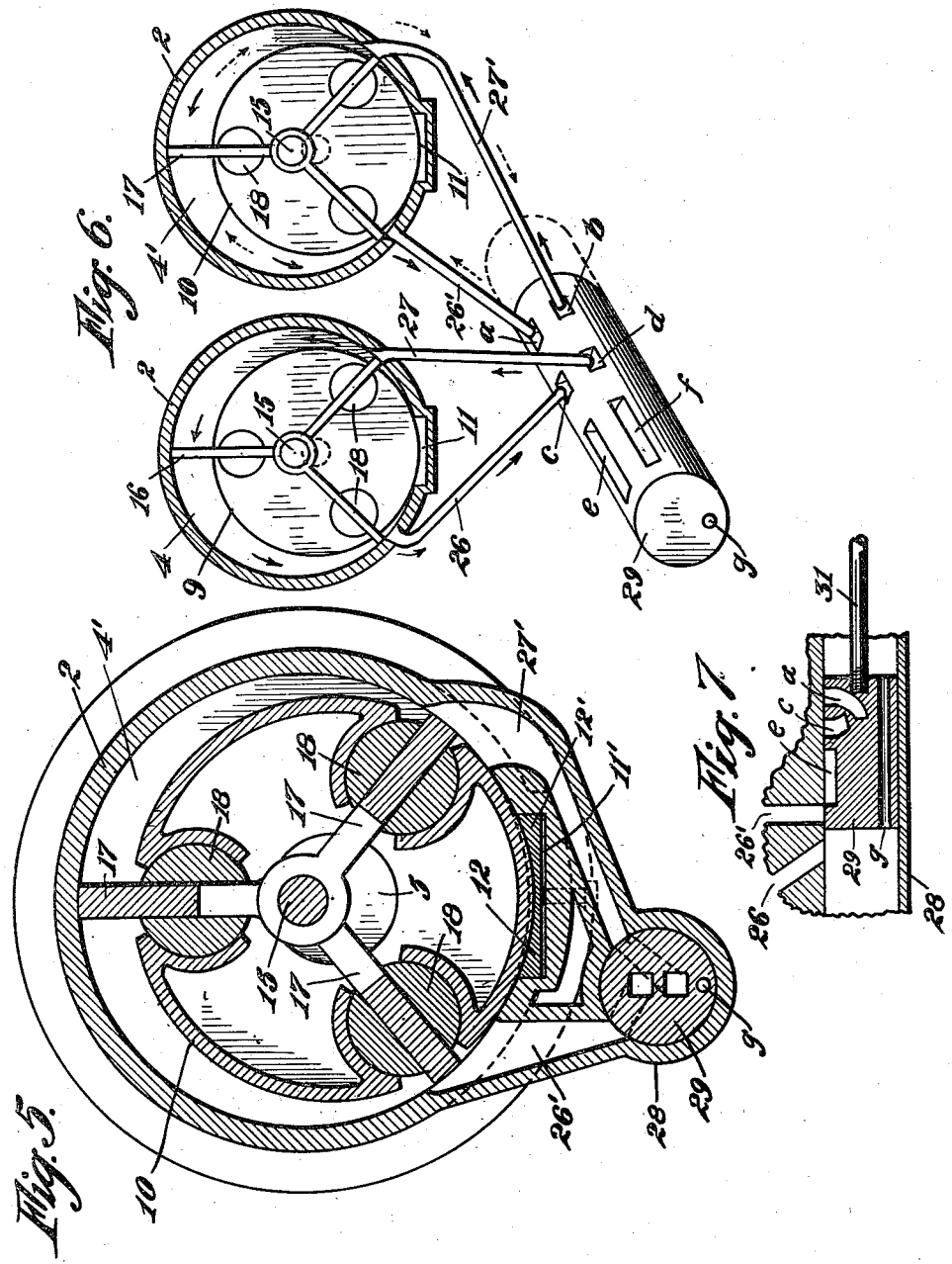
Witnesses:
R. S. Barry
F. E. Maynard
Inventor
Peter English
By Geo. H. Strong.
His Attorney.

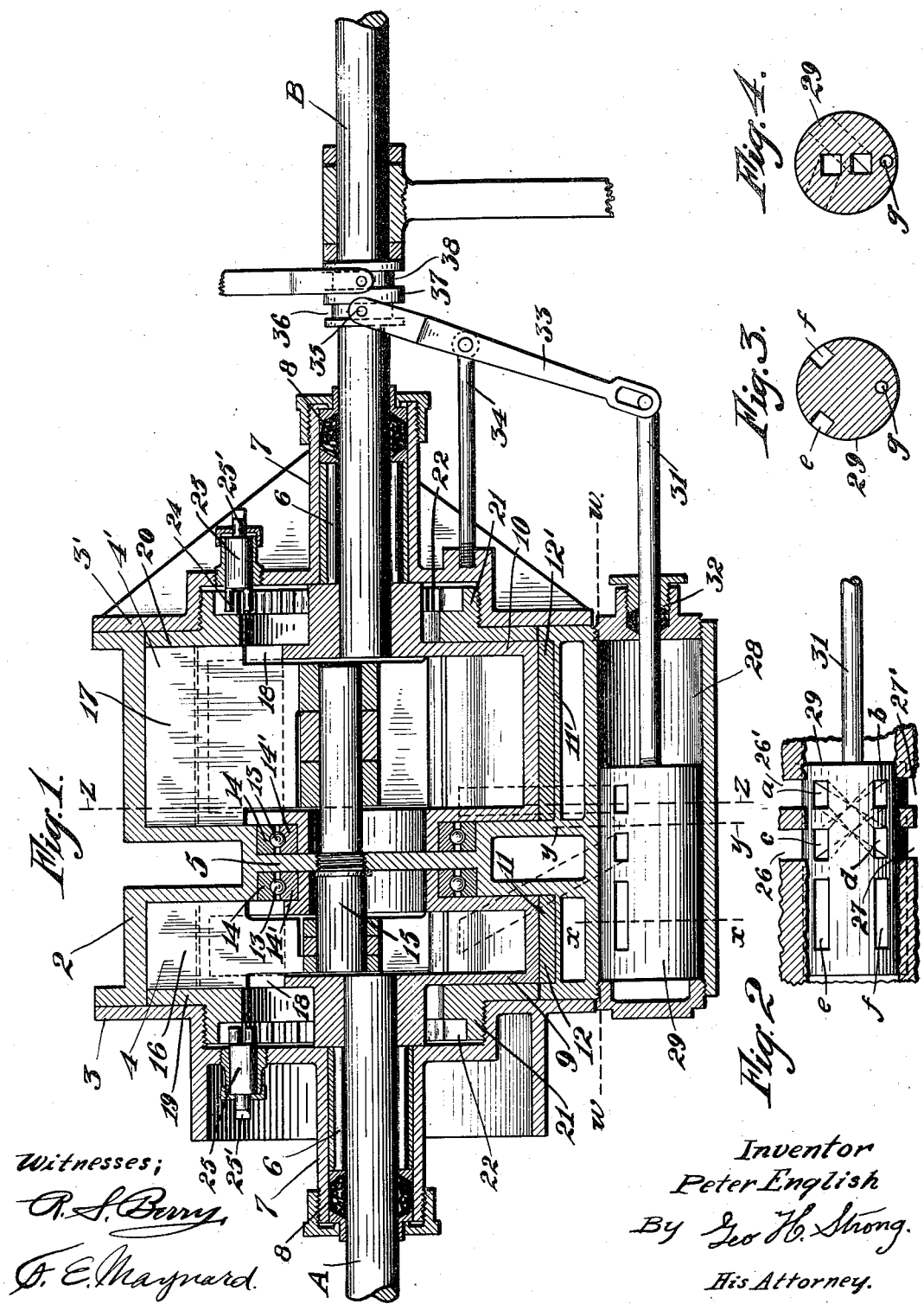

UNITED STATES PATENT OFFICE.

PETER ENGLISH, OF SAN FRANCISCO, CALIFORNIA, ASSIGNOR TO MILTON P. ROPP, OF SAN FRANCISCO, CALIFORNIA.

REVERSIBLE HYDRAULIC TRANSMISSION.

1,028,451. Specification of Letters Patent. Patented June 4, 1912.

Application filed July 21, 1910. Serial No. 573,060.

*To all whom it may concern:*

Be it known that I, PETER ENGLISH, citizen of the United States, residing in the city and county of San Francisco and State of California, have invented new and useful Improvements in Reversible Hydraulic Transmission, of which the following is a specification.

This invention relates to a hydraulic clutch, and particularly pertains to a reversible hydraulic clutch which is especially applicable for use on motor driven vehicles, such as automobiles and the like.

It is the object of this invention to provide a means for transmitting motion from a driving shaft to the shaft to be driven, which will permit of the speed of the driven shaft being varied to any desired extent.

A further object is to provide a motion transmitting device by means of which the direction of rotation of a driven shaft may be reversed as desired, and rotated in either direction at various speeds while the driving shaft is being rotated in one direction at a uniform speed.

Another object is to provide a reversible hydraulic clutch in which the various forward and reverse speeds may be controlled by one operating lever.
The invention consists of the parts and the construction and combination of parts as hereinafter more fully described and claimed, having reference to the accompanying drawings, in which—
Figure 1 is a longitudinal section of the invention. Fig. 2 is a section on the line W—W, Fig. 1, showing the piston valve in plan. Fig. 3 is a cross section of the valve on the line X—X. Fig. 4 is a cross section of the valve on the line Y—Y. Fig. 5 is a section of the invention on the line Z—Z. Fig. 6 is a diagrammatic view illustrating the manner of governing the circulation of the fluids in the clutch by the piston valve and also showing the arrangement of the ports in the valve piston. Fig. 7 is a detail showing the position of the valve piston when closing the conduits.

In the drawings A represents the driving shaft, and B the shaft to be driven.

2 is the casing inclosing the clutch mechanism, and is cylindrical in form. The ends of the cylindrical casing 2 are closed with end plates 3 and 3′, and the interior of the casing is divided into two fluid containing chambers or compartments 4—4′ by means of a partition 5.

The inner ends of the shafts A and B extend through the end plates 3—3′ respectively and are supported on roller bearings 6 in hubs 7 formed on each end plate 3 and 3′. Stuffing boxes or glands 8 are provided on the outer ends of the hubs 7, through which the shafts A—B extend. Mounted on the inner end of the shaft A is a hollow drum 9 and a similar drum 10 is mounted on the inner end of the shaft B. The drum 9 is approximately half the width of the drum 10 and is disposed within the compartment 4, while the drum 10 is located in the compartment 4′. These drums are of equal diameter and are concentrically mounted on their respective shafts and revoluble therewith.

The shafts A—B and the drums 9—10 are arranged in axial line with each other, but are eccentrically disposed in relation to the inner circumferential surface of the cylindrical casing 2, and are so placed that a portion of the outer edge or periphery of each drum 9—10 will extend into a recess 11—11′ formed in the lower portion of the inner surface of the cylindrical casing 2. These recesses 11—11′ are disposed in the compartments 4—4′ respectively, and extend thereacross the width of the drums 9—10, and have adjustably mounted therein abutment blocks 12—12′ which are adapted to be kept in close contact with the surface of that portion of the peripheries of the drums 9—10 which projects into the recesses 11—11′.

The drums 9—10 are of equal diameters and are sufficiently smaller in diameter than the interior of the casing 2 as to provide a passage in the chambers 4—4′ between the outer periphery of the drums and the inner periphery of the casing 2, this passage terminating at each end near the point where the abutment block contacts with a drum;
this passage being filled with a non-compressible fluid when in operation.

The inner faces of the drums 9 and 10 are provided with hubs which are supported in ball bearings 13 disposed between raceways 14—14′. The raceways 14 are mounted on shoulders formed on the interior of the casing 2 adjacent the partition 5, and the raceways 14′ are secured to the hubs on the inner faces of the hollow drums 9—10.

A pivot or pin 15 is mounted on the partition 5 and extends longitudinally of the cylinder 2 on the axial line thereof, the ends of the pin 15 projecting on each side of the partition 5 into the interior of the drums 9—10, and terminating near the opposite inner side of the drum. The pin 15 is secured in place by screw threads when it passes through the partition 5. Pivotally mounted on each projecting end of the pin 15 are radially disposed vanes or wings 16—17, which extend through slots formed in the outer surface or perimeter of the drums 9—10, and have their outer or end edges contacting with the circumferential walls of the chambers 4—4'. The wings 16—17 are as wide as the drums 9—10 for a distance from their outer ends, and the side edges of this wide portion contact with the side walls of the chambers 4—4'. These blades extend between approximately semi-cylindrical gibs 18 mounted in and extending through the drums 9—10, and are slidable therebetween, the gibs 18 being rockable in their housings in the drums 9—10.

Take-up plates 19—20, for the purpose of facilitating the assembly of parts or taking up or compensating for the wear on the flat faces of the drums 9—10, are disposed between the outer faces of the drums 9—10 and the end plates 3—3' and are mounted on the inner faces of the end plates 3—3', respectively, in the following manner:—A hub 21 is formed on the back of each plate 19—20, and is screw threaded on its outer surface. A hollow cylindrical extension is formed on each of the end plates 3—3', and is threaded on its inner surface so that the hub 21 on the corresponding take-up plate 19 or 20 may be secured therein. Gear teeth 22 are formed on the outer edge of the inner periphery of each hub 21, and are adapted to be engaged by a pair of spurs or pins 24 on spindles 25, revolubly mounted in and extending through each of the end plates 3—3'. The spindle 25 is provided with a wrench-hold 25' on its outer end by means of which it may be turned in either direction so as to rotate the take-up plates in their threaded mounting and cause them to move toward or away from the outer face of the drums 9—10.

Each of the compartments 4—4' is provided with inlet and outlet ports or conduits 26—27, and 26'—27', respectively, which open into or lead from the compartments at the ends of the chamber formed between the drums 9—10 and the inside of the casing 2; that is, on each side of the abutment blocks 12, as shown in Fig. 5. The conduits leading from the compartment 4 nearly parallel those leading from chamber 4', and all four conduits terminate in a valve casing 28 formed on the cylinder 2.

A valve piston 29 is reciprocally mounted in the valve casing 28 and is provided with a number of peculiarly arranged ports $a$, $b$, $c$, $d$, $e$, $f$, particularly shown in Fig. 6, which are adapted to register with the termination of the conduits 26—27, 26'—27' in the valve casing 28, as will be hereinafter more fully described. The ports $a$ and $d$ in the valve piston 29 intercommunicate, as shown in Fig. 2, as do the ports $b$ and $c$, the passages crossing each other at different points in the body of the piston with sufficient material between them to form separate conduits, as shown in Fig. 4. The valve piston 29 is also provided with a passage $g$, extending longitudinally therethrough, as shown in Fig. 7, the purpose of which is to permit of the passage of fluid from one side of the piston to the other as the piston is reciprocated in the casing 28. The piston 29 is operated by a rod 31 passing through a gland 32 and actuated by a lever 33 pivoted upon the end of a supporting rod 34, the other end of said lever being forked and having pins 35 engaging a groove 36 in a clutch collar 37, slidable upon the driven shaft B. The collar 37 also has a groove 38, which engages the forked end of an operating lever by means of which the collar 37 can be moved longitudinally so as to cause the piston 29 to slide in its casing and open and close the conduits, as may be desired.

In operation, it being desired to drive the shaft B in the same direction as that of the drive shaft A, the piston valve 29 is placed in the position shown in Figs. 1, 2, 5 and 6. In this position the port $c$ will register with the conduit 26; port $b$ with conduit 27'; port $d$ with conduit 27; and port $a$ with conduit 26' in such manner that the noncompressible fluid with which the interior of the casing 2 and the conduits are filled, may be caused to circulate in the direction of the arrows, Fig. 6, by the rotation of the driving shaft A and the drum 9 with its wings 16; that is, as the fluid is carried around the interior of the compartment 4 by the blades 16 it is forced through the conduit 26, ports $c$ and $b$ in the valve piston, and conduit 27' into the chamber 4', when it acts upon the blades 17 to rotate the drum 10 and the shaft B in the same direction as that taken by the shaft A, the fluid returning to the chamber 4 through the conduit 26', valve ports $a$ and $d$, and conduit 27, when it is again acted on by the blades 16. The entire interior of the compartments 4—4' and the space leading from one to the other being completely filled with a non-compressible fluid, the fluid is caused to continuously circulate when the driving shaft A is rotated. When it is desired to rotate the shaft B in an opposite direction to that of the shaft A, the piston valve 29 is moved forward by means of the lever 33 to an intermediate position, in which position the elongated port e will register with the conduits 26 and 26' and the port f will register with the conduits 27—27' in such manner that the flow of the fluid from the chamber 4 will enter chamber 4' through the conduit 26', and thereby rotate the drum 10 and shaft B in an opposite direction to that of the drum 9 and shaft A, as indicated by the dotted arrows in Fig. 6. When it is desired to rotate the drive shaft A, independent of the shaft B, the piston 29 is moved to its foremost position in the valve chamber 28, as shown in Fig. 7. In this position the fluid passing from the chamber 4 out of the conduit 26 enters the valve chamber back of the piston 29, and thence passes through the conduit 27 back into the chamber 4 on the opposite side of the drum 9, and as the latter revolves it is carried therewith by the blades 16. From this it will be seen that the drum 9 and blades 16 can be rotated within the chamber 4 when the piston 29 is in its forward-most position, the fluid circulating freely behind the piston and not entering the ports therein to effect the blades 17 and drum 10 within the chamber 4'.

The casing 2 inclosing the clutch mechanism is supported upon the shafts A and B, and when the valve ports are but partially opened, or fully closed, it is rotatable with the shaft A at a speed proportional to the extent of the valve opening. For instance, where the ports are tightly closed so as to prevent a circulation of the fluid in the chambers 4—4', the casing will travel with the shaft A at the same speed, and when the ports are but partly open, to allow a circulation of the fluid, the casing will move slower than the drive shaft A, this being especially true where the same direction of rotation is given the shaft B. On the reverse of the shaft B, however, the casing 2 will remain still, and the speed of the shaft B will be governed entirely by regulating the area of port opening in the valve casing; the speed of the driven shaft B being at all times proportional to that of the driving shaft A as the port areas are increased or decreased.

A brake-drum 40 is provided on the end plate 3 and is adapted to be subjected to the action of any suitable brake for the purpose of retarding or blocking the rotation of the casing 2, when desired.

Having thus described my invention, what I claim and desire to secure by Letters-Patent, is—

A motion transmitting device including a cylindrical two part casing with a transverse dividing web, independent axially alined driving and driven shafts journaled in opposite ends of the casing and eccentric thereto, slotted drums fixed to the inner ends of said shafts, with their peripheries forming close joints with the ends and one side of the inner peripheries of the casings, crescent shaped spaces between the drums and the opposite sides, a filling of non-compressible liquid, a pin fixed in the central web axially of the casings and projecting into each compartment thereof, wings or vanes carried upon said pin, slidable within the slotted drums and fitting the interior of the drum casings, a valve casing, a valve slidable therein and having pairs of ports, passages connecting the casings and the valve casing, and means to move the valve to connect different pairs of ports with the passages.

In testimony whereof I have hereunto set my hand in the presence of two subscribing witnesses.

PETER ENGLISH.

Witnesses:
CHARLES A. PENFIELD,
CHARLES EDELMAN.